(12) United States Patent
Katoh et al.

(10) Patent No.: US 8,013,955 B2
(45) Date of Patent: Sep. 6, 2011

(54) LIQUID CRYSTAL DISPLAY WITH OPENING IN REFLECTIVE ELECTRODE

(75) Inventors: Hiromi Katoh, Nara (JP); Christopher Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 259 days.

(21) Appl. No.: 12/444,901

(22) PCT Filed: Jun. 19, 2007

(86) PCT No.: PCT/JP2007/062303
§ 371 (c)(1),
(2), (4) Date: Apr. 9, 2009

(87) PCT Pub. No.: WO2008/044369
PCT Pub. Date: Apr. 17, 2008

(65) Prior Publication Data
US 2010/0045904 A1   Feb. 25, 2010

(30) Foreign Application Priority Data

Oct. 11, 2006   (JP) .................................. 2006-277839

(51) Int. Cl.
*G02F 1/1335* (2006.01)

(52) U.S. Cl. ...................................................... 349/106

(58) Field of Classification Search .................. 349/105, 349/106, 107, 42–44, 12, 28, 110, 116; 345/180–182, 81, 104, 179
See application file for complete search history.

(56) References Cited

U.S. PATENT DOCUMENTS

| 6,069,674 A | 5/2000 | Aomori et al. |
| 6,215,538 B1 | 4/2001 | Narutaki et al. |
| 6,243,069 B1 | 6/2001 | Ogawa et al. |
| 2004/0047050 A1* | 3/2004 | Bauer et al. .................... 359/738 |

(Continued)

FOREIGN PATENT DOCUMENTS

WO   2006/104204 A1   10/2006

OTHER PUBLICATIONS

Supplementary EP Search Report mailed Oct. 5, 2009 in EP application 07767171.7.

(Continued)

*Primary Examiner* — Akm Ullah
(74) *Attorney, Agent, or Firm* — Nixon & Vanderhye P.C.

(57) ABSTRACT

A liquid crystal display is provided that can achieve an improvement in sensitivity of a photodiode disposed within a display region of an active matrix substrate. To this end, a liquid crystal display is used that includes: an active matrix substrate 1 in which a plurality of pixels are arranged in matrix form; and a counter substrate in which a color filter is provided. In the liquid crystal display, the active matrix substrate 1 includes a photodiode 11 within a display region, and the color filter includes colored areas 6a to 6c that are in one-to-one correspondence with sub-pixels 5a to 5c that constitute a pixel. Each of the colored areas 6a to 6c includes a high-transmittance portion 31 having a transmittance higher than a transmittance of a periphery of the high-transmittance portion 31. Of these colored areas 6a to 6c, the colored area 6a is formed so that the high-transmittance portion 31 positionally coincides with an i layer 13 (light detection region) of the photodiode 11 in a thickness direction of the liquid crystal display.

3 Claims, 2 Drawing Sheets

U.S. PATENT DOCUMENTS

| | | |
|---|---|---|
| 2004/0169793 A1 | 9/2004 | Ino et al. |
| 2005/0045881 A1 | 3/2005 | Nakamura et al. |
| 2005/0052435 A1 | 3/2005 | Cho et al. |
| 2005/0134751 A1 | 6/2005 | Abileah et al. |
| 2005/0139751 A1 | 6/2005 | Park et al. |
| 2006/0055852 A1 | 3/2006 | Yoshida et al. |
| 2006/0146376 A1* | 7/2006 | Kim .............................. 358/482 |
| 2007/0045520 A1* | 3/2007 | Mitsui ....................... 250/214 R |

OTHER PUBLICATIONS

International Search Report for PCT/JP2007/062303 mailed Sep. 25, 2007.

Nakamura et al., "21.4L: Late-News Paper: A Touch Panel Function Integrated LCD Including LTPS A/D Converter", *SID '05 Digest*, 2005, pp. 1054-1055.

* cited by examiner

LIQUID CRYSTAL DISPLAY WITH OPENING IN REFLECTIVE ELECTRODE

This application is the U.S. national phase of International Application No. PCT/JP2007/062303 filed 19 Jun. 2007 which designated the U.S. and claims priority to Japanese Patent Application No. 2006-277839 filed 11 Oct. 2006, the entire contents of each of which are hereby incorporated by reference.

TECHNICAL FIELD

The present invention relates to a liquid crystal display including a photodiode that reacts to light incident from a viewer side of a display screen.

BACKGROUND ART

Liquid crystal displays of recent years are characterized by achieving low power consumption, thinness and light weight and thus have been in wide use as displays for a computer, a cellular phone, a PDA, and a video game machine. A typical liquid crystal display includes a liquid crystal display panel and a backlight by which the liquid crystal display panel is illuminated from its rear surface. The liquid crystal display panel is constituted by sandwiching a liquid crystal layer between an active matrix substrate and a counter substrate.

The active matrix substrate is constituted by forming a plurality of pixels in matrix form on a glass substrate. Further, in the case where a color display is performed, generally, one pixel is composed of three sub-pixels. Each of the sub-pixels is provided with a TFT and a pixel electrode. Moreover, the counter substrate includes a counter electrode and a color filter that are provided on a glass substrate. The color filter has colored areas of red (R), green (G), and blue (B) colors, which are in one-to-one correspondence with the sub-pixels.

In the liquid crystal display of this type, a voltage applied between each of the pixel electrodes and the counter electrode is controlled so that the transmittance of the liquid crystal layer is controlled with respect to each of the sub-pixels. As a result of this control, an image is displayed on a display screen by means of illumination light from the backlight that has been transmitted through the liquid crystal layer and each of the colored areas.

With respect to the conventional liquid crystal displays having the above-described function of displaying an image, there recently has been proposed a liquid crystal display that also has a function of capturing an image (see, for example, Patent Document 1). In the liquid crystal display disclosed in Patent Document 1, a plurality of photodiodes are formed in matrix form on an active matrix substrates and a liquid crystal display panel functions as an area sensor.

Furthermore, in Patent Document 1, PIN diodes of a lateral structure are used as the photodiodes. Using the processes of forming a TFT, each of the PIN diodes is formed by providing a p layer, an i layer, and an n layer in this order on a silicon film that is used also for the TFT. Further, on a backlight side of each of the PIN diodes, generally, a light-blocking film is provided in order to prevent illumination light from a backlight from being incident on the each of the PIN diodes.
Patent document 1: JP 2006-3857 A

DISCLOSURE OF INVENTION

Problem to be Solved by the Invention

Meanwhile, in Patent Document 1, since the plurality of photodiodes constitute the area sensor, the photodiodes are disposed within a display region. Consequently, the photodiodes positionally coincide with colored areas of a color filter in a thickness direction, so that incident light from a viewer side enters the photodiodes after being attenuated by the colored areas of the color filter. Because of this, the liquid crystal display of Patent Document 1 presents a problem that the amount of light detectable by the photodiodes decreases, leading to a deterioration of the sensitivity of a system as a whole.

It is an object of the present invention to provide a liquid crystal display that solves the above-described problem and can achieve an improvement in sensitivity of a photodiode disposed within a display region of an active matrix substrate.

Means for Solving Problem

In order to achieve the above-described object, a liquid crystal display according to the present invention includes: an active matrix substrate in which a plurality of pixels are arranged in matrix form; and a counter substrate in which a color filter is provided. In the liquid crystal display, the active matrix substrate includes a plurality of photodiodes within a display region, and each of the plurality of pixels includes two or more sub-pixels. Further, the color filter includes colored areas that are in one-to-one correspondence with the sub-pixels, and each of the colored areas is formed so as not to positionally coincide with a light detection region of each of the plurality of photodiodes in a thickness direction of the liquid crystal display or includes a high-transmittance portion having a transmittance higher than a transmittance of a periphery of the high-transmittance portion and is formed so that the high-transmittance portion positionally coincides with the light detection region of each of the plurality of photodiodes in the thickness direction of the liquid crystal display.

Effects of the Invention

As described above, in the liquid crystal display according to the present invention, each of the colored areas is formed so as not to be present immediately above the light detection region of each of the photodiodes, or alternatively, when made present immediately above the light detection region, each of the colored areas is formed so that the high-transmittance portion thereof positionally coincides with the light detection region. Thus, the liquid crystal display according to the present invention can achieve an improvement in sensitivity of a photodiode disposed within a display region of an active matrix substrate.

EMBODIMENTS OF THE INVENTION

Figure 1:
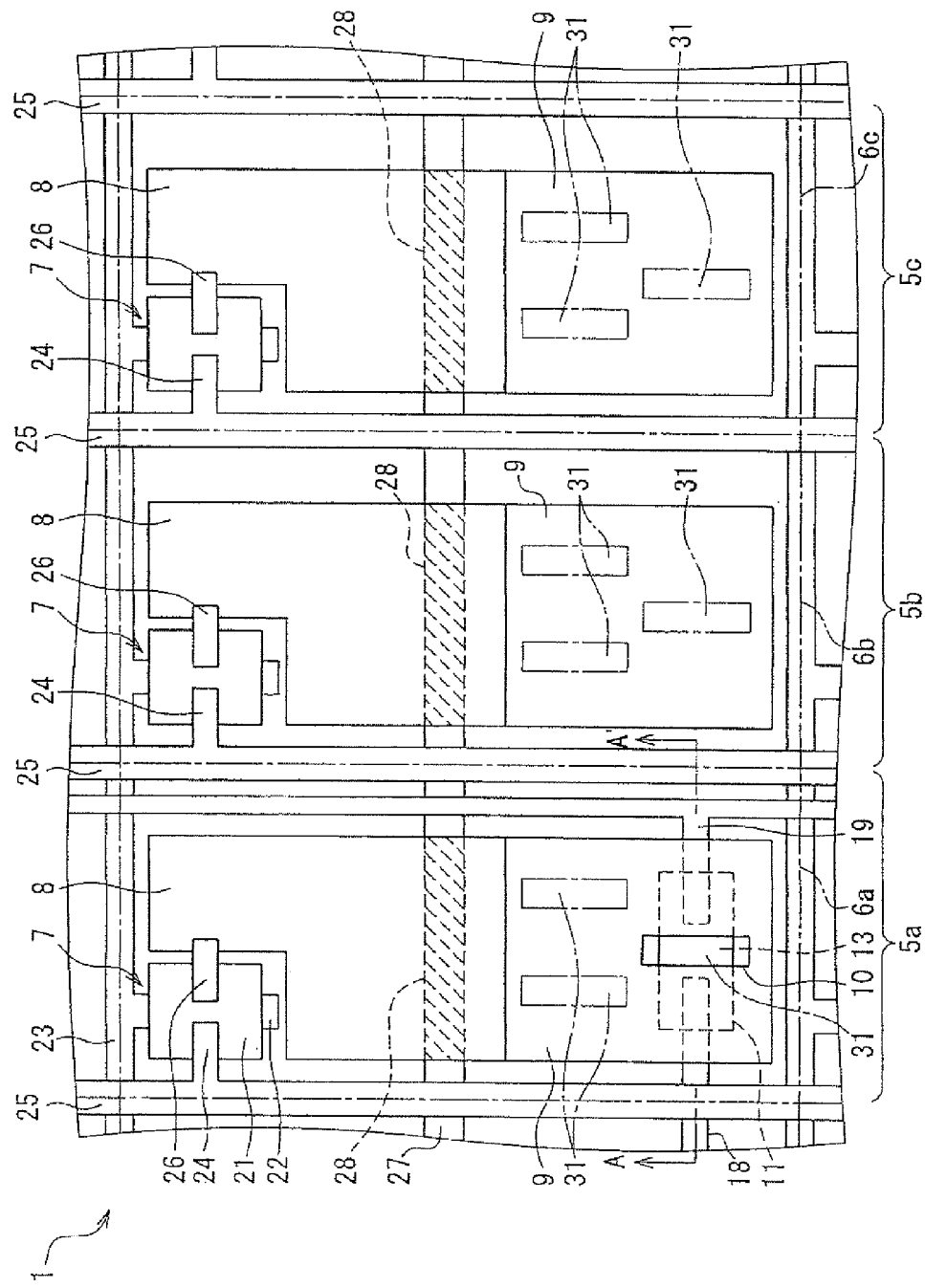
FIG. 1 is a plan view showing part of a configuration of a liquid crystal display according to an embodiment of the present invention.

The liquid crystal display according to the present invention includes: an active matrix substrate in which a plurality of pixels are arranged in matrix form; and a counter substrate in which a color filter is provided. In the liquid crystal display, the active matrix substrate includes a plurality of photodiodes within a display region, and each of the plurality of pixels includes two or more sub-pixels. Further, the color filter includes colored areas that are in one-to-one correspondence with the sub-pixels, and each of the colored areas is formed so as not to positionally coincide with a light detection region of each of the plurality of photodiodes in a thickness direction of the liquid crystal display, or includes a high-transmittance portion having a transmittance higher than a transmittance of a periphery of the high-transmittance portion and is formed so that the high-transmittance portion positionally coincides with the light detection region of each of the plurality of photodiodes in the thickness direction of the liquid crystal display.

Furthermore, the above-described liquid crystal display according to the present invention can assume the following embodiment. That is, each of the sub-pixels includes an active element, a transparent electrode, and a reflective electrode that reflects light incident from a viewer side. Each of the colored areas is formed so as to positionally coincide with both of the transparent electrode and the reflective electrode of a corresponding one of the sub-pixels in the thickness direction of the liquid crystal display, and includes the high-transmittance portion at a portion that positionally coincides with the reflective electrode. Each of the plurality of photodiodes is disposed in a lower layer of any one of the reflective electrodes, and in the one of the reflective electrodes with the lower layer including the each of the plurality of photodiodes, an opening from which the light detection region is exposed is provided at a portion that positionally coincides with the high-transmittance portion in the thickness direction of the liquid crystal display.

In a liquid crystal display having both of a function of a transmission type liquid crystal display and a function of a reflection type liquid crystal display, for the prime purpose of balancing a color purity of light reflected from a reflection region with a color purity of light transmitted though a transmission region, a high-transmittance portion may be formed at a portion of each of colored areas, which positionally coincides with a reflective electrode. In the above-described embodiment, this high-transmittance portion is used so that light can be made incident on each of the photodiodes without being attenuated. The above-described embodiment eliminates the need to separately form a high-transmittance portion and thus can suppress a cost increase of a liquid crystal display.

Furthermore, in the above-described liquid crystal display according to the present invention, each of the photodiodes may be formed of a silicon film that is provided on a base substrate of the active matrix substrate. In this case, in the silicon film, a semiconductor region of a first conductive type, an intrinsic semiconductor region, and a semiconductor region of a second conductive type opposite to the first conductive type are provided in this order along a plane direction of the silicon film, and the intrinsic semiconductor region acts as the light detection region.

Embodiment

Figure 2:
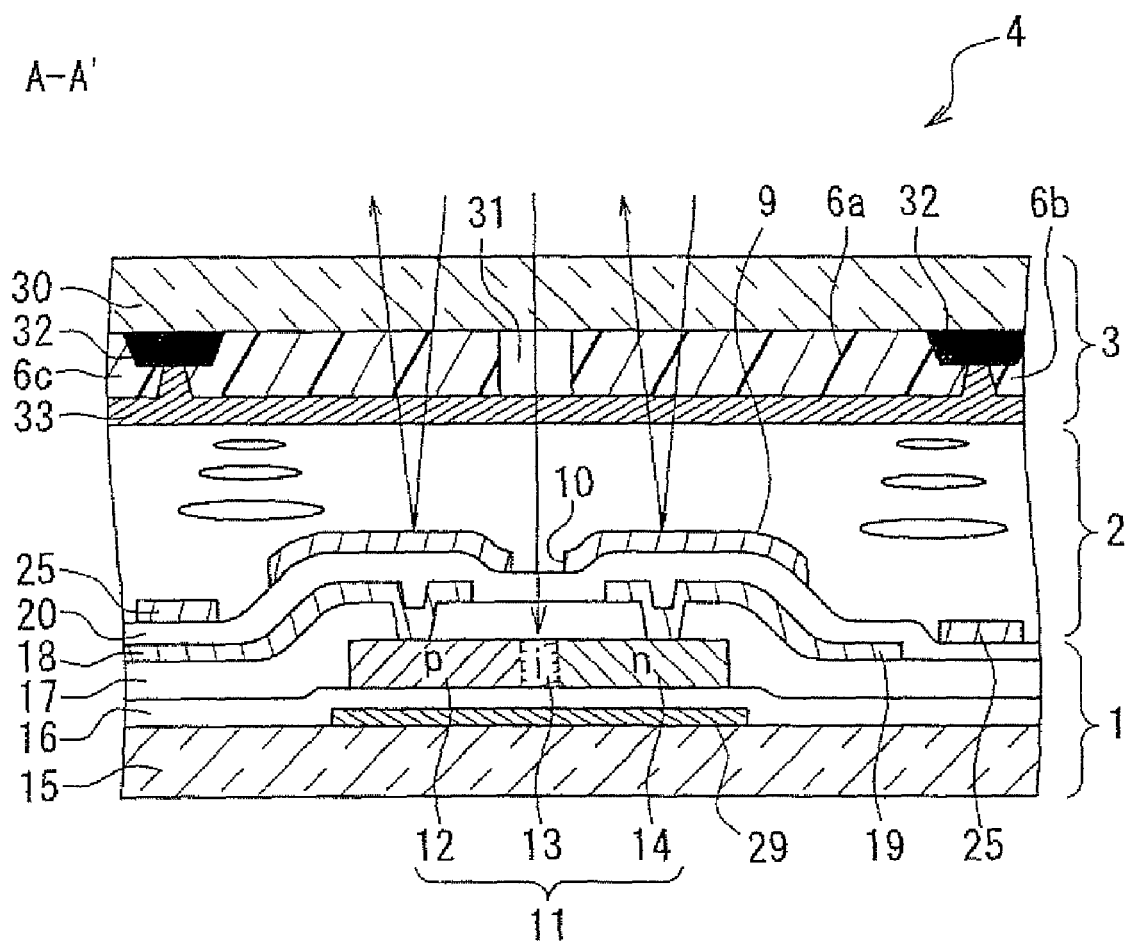
FIG. 2 is a cross-sectional view showing a cross section taken along a cutting line A-A of FIG. 1.

Hereinafter, a liquid crystal display according to an embodiment of the present invention will be described with reference to FIGS. 1 and 2. FIG. 1 is a plan view showing part of a configuration of the liquid crystal display according to the embodiment of the present invention. FIG. 2 is a cross-sectional view showing a cross section taken along a cutting line A-A' of FIG. 1.

In FIG. 1, a structure of a pixel formed in an active matrix substrate is shown mainly, and as for a counter substrate, only the outside shapes of colored areas is shown by alternate long and short dashed lines. Further, in FIG. 1, an interlayer insulating film is omitted. In FIG. 2, hatching of the interlayer insulating film is omitted. Further, in the cross-sectional view shown in FIG. 2, only lines appearing in the cross section are shown.

The liquid crystal display according to this embodiment includes a liquid crystal display panel 4 shown in FIG. 2 and a backlight (not shown) by which the liquid crystal display panel 4 is illuminated from its rear surface. As shown in FIGS. 1 and 2, the liquid crystal display panel 4 includes an active matrix substrate 1, a liquid crystal layer 2, and a counter substrate 3, and is formed by sandwiching the liquid crystal layer 2 between these two substrates. Although not shown in the figures, the liquid crystal display according to this embodiment further includes various types of optical films in addition to the above-described constituent elements.

Furthermore, as shown in FIG. 1, the active matrix substrate 1 includes pixels. Although not shown in FIGS. 1 and 2, a plurality of pixels are arranged in matrix form. In the active matrix substrate 1, a region in which the plurality of pixels are arranged acts as a display region. Further, in this embodiment, one pixel is composed of three sub-pixels. In FIG. 1, only three sub-pixels 5a to 5c are shown.

In this embodiment, the liquid crystal display panel 4 functions suitably for both of a transmission type liquid crystal display and a reflection type liquid crystal display. Therefore, as shown in FIG. 1, each of the sub-pixels 5a to 5c includes an active element 7, a transparent electrode 8, and a reflective electrode 9. The active element 7 is a thin film transistor (TFT). The transparent electrode 8 is a pixel electrode made of ITO or the like. The reflective electrode 9 is made of a metallic material and connected electrically to the transparent electrode 8. As shown in FIG. 2, the reflective electrode 9 reflects light incident from a viewer side.

Furthermore, in this embodiment, the active element 7 includes a silicon film 21 in which a source region and a drain region are formed and a gate electrode 22. The gate electrode 22 is formed integrally with a gate line 23 disposed along a horizontal direction of a screen. Further, a source electrode 24 is connected to the source region, and a drain electrode 26 is connected to the drain region. The source electrode 24 is formed integrally with a source wiring 25 disposed along a vertical direction of the screen. The drain electrode 26 is connected to the transparent electrode 8. In FIG. 1, reference numeral 27 denotes a wiring for a storage capacity, and reference numeral 28 denotes a region in which a storage capacity is formed.

Furthermore, as shown in FIGS. 1 and 2, the active matrix substrate 1 includes a photodiode 11 within the display region. Although FIGS. 1 and 2 show only one photodiode 11, in practice, the photodiode 11 is disposed with respect to each pixel in the active matrix substrate 1. A plurality of the photodiodes 11, each disposed with respect to each pixel, function as an area sensor. The disposition of the photodiode 11 may be such that two or more photodiodes 11 are disposed with respect to each pixel, e.g. one photodiode 11 is disposed with respect to each sub-pixel, or one photodiode 11 is disposed with respect to a plurality of pixels.

As shown in FIG. 2, in this embodiment, the photodiode 11 is a PIN diode having a lateral structure. The photodiode 11 includes a silicon film provided over a glass substrate 15 that acts as a base substrate of the active matrix substrate 1. In the silicon film, a p-type semiconductor region (p layer) 12, an intrinsic semiconductor region (i layer) 13, and an n-type semiconductor region (n layer) 14 are provided in this order along a plane direction.

In the photodiode 11, the i layer 13 acts as a light detection region. In this embodiment, it is only required that the i layer 13 be a region more nearly electrically-neutral than the p layer 12 and the n layer 14 that are adjacent thereto. It is preferable that the i layer 13 is a region containing no impurities or a region whose conduction electron density and positive hole density are equal.

In FIG. 2, reference numeral 16 denotes an insulating film formed on the glass substrate 15, and the photodiode 11 is formed on the insulating film 16. Further, a light-blocking film 29 made of a conductive metallic material is formed in a lower layer of the photodiode 11 in order to prevent illumination light from the backlight (not shown) from being incident on the photodiode 11. Moreover, the photodiode 11 is covered with an interlayer insulating film 17. Reference numeral 18 denotes a wiring connected to the p layer 12, and reference numeral 19 denotes a wiring connected to the n layer 14.

Furthermore, as shown in FIGS. 1 and 2, the counter substrate 3 includes a color filter having a plurality of colored areas. The colored areas are provided in one-to-one correspondence with the sub-pixels. In FIG. 1, of a large number of the colored areas, only colored areas 6a to 6c that correspond respectively to the sub-pixels 5a to 5c are shown.

Specifically, as shown in FIG. 2, the colored areas 6a to 6c are formed on a surface of a glass substrate 30 that acts as a base substrate of the counter substrate 3. Moreover, a black matrix 32 for blocking light is provided between each pair of adjacent ones of the colored areas. Further, a transparent counter electrode 33 is formed so as to cover all the colored areas.

In this embodiment, the colored area 6a is a colored area of a blue color (B), the colored area 6b is a colored area of a green color (G), and the colored area 6c is a colored area of a red color (R). Further, each of the colored areas 6a to 6c is formed so as to positionally coincide with both of the transparent electrode 8 and the reflective electrode 9 of a corresponding one of the sub-pixels in a thickness direction of the liquid crystal display.

As described above, similarly to the conventional liquid crystal displays, the liquid crystal display according to this embodiment has a display function and an imaging function. However, the liquid crystal display according to this embodiment is different from the conventional liquid crystal displays in the following respect.

In this embodiment, each of the colored areas 6a to 6c includes, at a portion that positionally coincides with the reflective electrode 9, a high-transmittance portion 31 formed so as to have a transmittance higher than a transmittance of a periphery thereof. Since the liquid crystal display according to this embodiment has both of the function of a transmission type liquid crystal display and the function of a reflection type liquid crystal display, the high-transmittance portion 31 is intended to balance a color purity of light reflected from the reflective electrode 9 with a color purity of light transmitted through the transparent electrode 8.

In the example shown in FIGS. 1 and 2, the high-transmittance portion 31 is formed of a transparent resin layer containing no pigment or dye. The high-transmittance portion 31 may take other forms such as a mere opening and a thin portion formed so as to be thinner than a periphery thereof. In FIG. 2, hatching of the high-transmittance portion 31 is omitted.

Furthermore, the photodiode 11 is disposed so that the i layer 13 positionally coincides with the high-transmittance portion 31 in the thickness direction of the liquid crystal display. Moreover, the photodiode 11 is disposed in a lower layer of the reflective electrode 9, and in the reflective electrode 9 with its lower layer including the photodiode 11, an opening 10 from which the i layer 13 is exposed is provided at a portion that positionally coincides with the high-transmittance portion 31 in the thickness direction of the liquid crystal display. As shown in FIG. 2, the photodiode 11 is covered with the interlayer insulating films 17 and 20, and these insulating layers are all transparent.

In the liquid crystal display according to this embodiment, the above-described configuration allows no colored area to be present immediately above the i layer 13 (light detection region) of the photodiode 11. Therefore, as shown in FIG. 2, light directed toward the i layer 13 enters the i layer 13 without being attenuated by a corresponding one of the colored areas. Thus, according to this embodiment, compared with the conventional example, the sensitivity of the photodiode 11 disposed within the display region of the active matrix substrate 1 can be improved.

Furthermore, in this embodiment, utilizing the high-transmittance portion 31 provided for the purpose of balancing color purities, light can be made incident on the i layer 13 of the photodiode 11 without being attenuated. Thus, this embodiment eliminates the need to separately provide a high-transmittance portion to be used for the photodiode 11 and thus suppresses an increase in the manufacturing cost of the liquid crystal display panel 4.

This embodiment also may be embodied such that, differently from the example shown in FIG. 1, each colored area is formed so as not to position ally coincide with a light detection region of a photodiode in a thickness direction of a liquid crystal display. For example, a portion of a colored area that positionally coincides with a reflective electrode is formed in a size smaller than the reflective electrode so that a circumferential edge portion of the reflective electrode does not positionally coincide with the colored area. Further, an opening is provided in the circumferential edge portion of the reflective electrode that does not positionally coincide with the colored area, and a photodiode is disposed so that a light detection region is aligned with this opening. Also in this case, similarly to the example shown in FIGS. 1 and 2, the sensitivity of a photodiode can be improved.

INDUSTRIAL APPLICABILITY

As described in the foregoing discussion, according to the present invention, in a liquid crystal display including a photodiode that reacts to light incident from a viewer side of a display screen, the sensitivity of the photodiode can be improved. The liquid crystal display according to the present invention thus is industrially applicable.

The invention claimed is:

1. A liquid crystal display, comprising;
an active matrix substrate in which a plurality of pixels are arranged in matrix form;
a counter substrate in which a color filter is provided,
wherein the active matrix substrate includes a plurality of photodiodes within a display region,
each of the plurality of pixels includes two or more sub-pixels,
each of the sub-pixels includes a reflective electrode that reflects light incident from a viewer side,
each of the reflective electrodes including an opening through which a photodiode light detection region is exposed,
the color filter includes colored areas that are in one-to-one correspondence with the sub-pixels,
wherein, in a given sub-pixel, the color filter comprises a colored area and a high-transmittance area defined in the colored area, the high-transmittance area having a higher transmittance than the colored area, and wherein the high-transmittance area in the sub-pixel at least partially overlaps the photodiode light detection region at the opening as viewed from the viewer side.

2. The liquid crystal display according to claim 1,
wherein each of the sub-pixels includes an active element, a transparent electrode, and the reflective electrode that reflects light incident from a viewer side, each of the colored areas is formed so as to positionally coincide with both of the transparent electrode and the reflective electrode of a corresponding one of the sub-pixels in the thickness direction of the liquid crystal display, and includes the high-transmittance portion at a portion that positionally coincides with the reflective electrode, each of the plurality of photodiodes is disposed in a lower layer of any one of the reflective electrodes.

3. The liquid crystal display according to claim 1,
wherein each of the photodiodes is formed of a silicon film that is provided on a base substrate of the active matrix substrate, in the silicon film, a semiconductor region of a first conductive type, an intrinsic semiconductor region, and a semiconductor region of a second conductive type opposite to the first conductive type are provided in this order along a plane direction of the silicon film, and the intrinsic semiconductor region acts as the light detection region.

\* \* \* \* \*